(12) United States Patent
Gandhi et al.

(10) Patent No.: US 11,818,651 B2
(45) Date of Patent: Nov. 14, 2023

(54) BEST LINKS FOR WIRELESS CLIENTS

(71) Applicant: Cisco Technology, Inc., San Jose, CA (US)

(72) Inventors: Indermeet Singh Gandhi, San Jose, CA (US); Malcolm Muir Smith, Richardson, TX (US); Jerome Henry, Pittsboro, NC (US); Robert E. Barton, Richmond (CA)

(73) Assignee: Cisco Technology, Inc., San Jose, CA (US)

( * ) Notice: Subject to any disclaimer, the term of this patent is extended or adjusted under 35 U.S.C. 154(b) by 130 days.

(21) Appl. No.: 17/223,781

(22) Filed: Apr. 6, 2021

(65) Prior Publication Data
US 2022/0322219 A1 Oct. 6, 2022

(51) Int. Cl.
*H04W 48/18* (2009.01)
*G06F 3/01* (2006.01)
*H04L 67/104* (2022.01)
*H04W 8/22* (2009.01)
*H04W 76/11* (2018.01)

(52) U.S. Cl.
CPC ............ *H04W 48/18* (2013.01); *G06F 3/017* (2013.01); *H04L 67/1046* (2013.01); *H04W 8/22* (2013.01); *H04W 76/11* (2018.02)

(58) Field of Classification Search
CPC ....... H04W 48/18; H04W 8/22; H04W 76/11; H04W 76/15; G06F 3/017; H04L 67/1046; H04L 67/303
See application file for complete search history.

(56) References Cited

U.S. PATENT DOCUMENTS

| | | | |
|---|---|---|---|
| 2015/0117228 A1 | 4/2015 | Daub et al. | |
| 2017/0123487 A1* | 5/2017 | Hazra | G06F 3/04845 |
| 2019/0116513 A1 | 4/2019 | Verma et al. | |
| 2019/0335454 A1 | 10/2019 | Huang et al. | |
| 2020/0112961 A1 | 4/2020 | Gupta et al. | |
| 2020/0221545 A1 | 7/2020 | Stacey et al. | |
| 2022/0210767 A1* | 6/2022 | Yang | H04W 72/048 |

\* cited by examiner

Primary Examiner — Marcos L Torres
(74) Attorney, Agent, or Firm — Merchant & Gould P.C.

(57) ABSTRACT

Best links for wireless clients may be provided. A computing device may receive, from a client device, a request to join a network. Then, in response to receiving the request to join the network, initial characteristics of the client device may be evaluated. Next, an initial plurality of links list may be provided to the client device in response to evaluating the initial characteristics of the client device. Subsequent characteristics of the client device may then be evaluated. An updated plurality of links list may be provided to the client device in response to evaluating the subsequent characteristics of the client device.

10 Claims, 4 Drawing Sheets

FIG. 2

BEST LINKS FOR WIRELESS CLIENTS

TECHNICAL FIELD

The present disclosure relates generally to determining best links for wireless clients.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings:

FIG. 2 is a diagram that illustrates possible link-pair combinations a multi-link sensor may scan;

DETAILED DESCRIPTION

Overview

Figure 1:
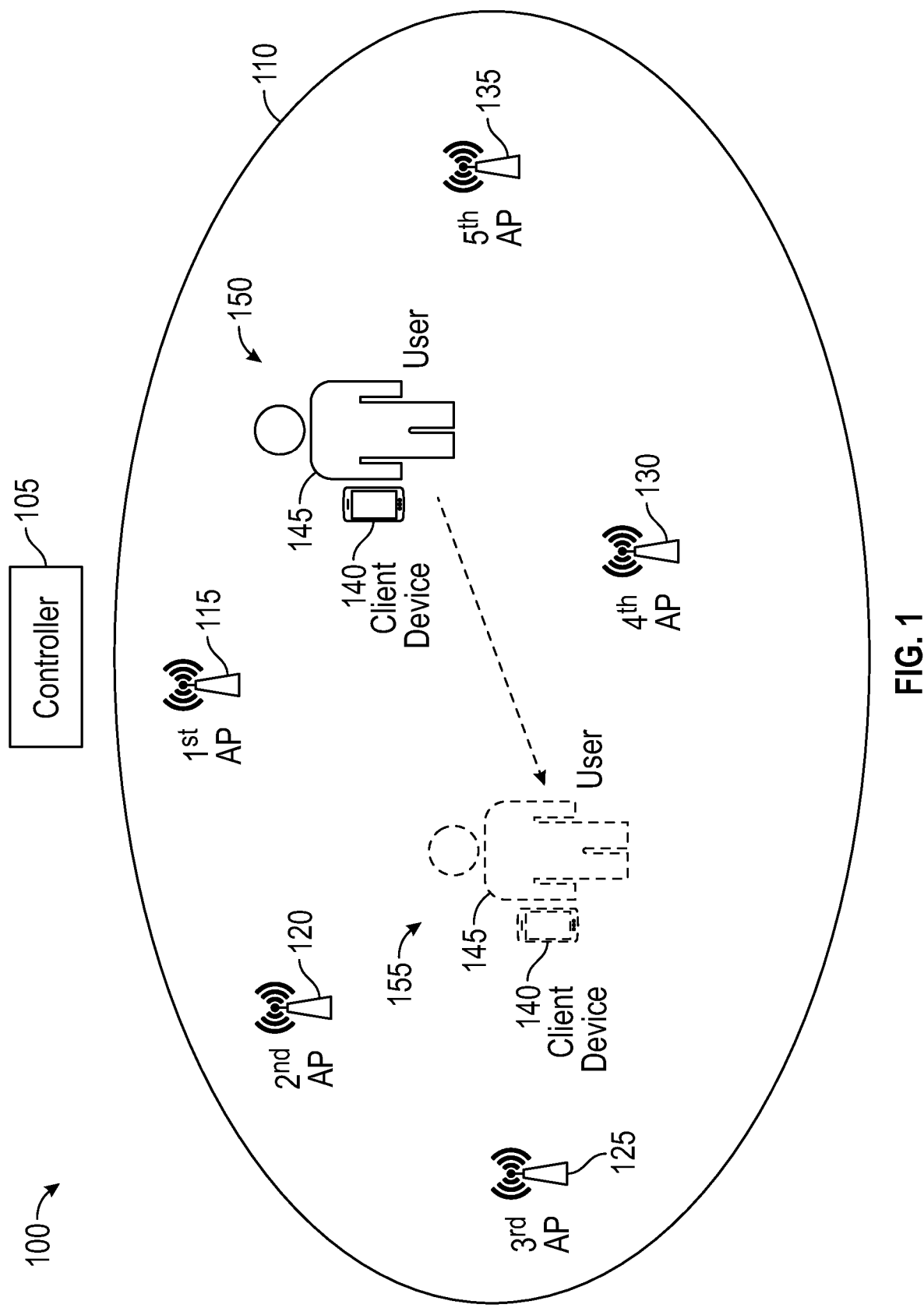
FIG. 1 is a block diagram of an operating environment for providing best links for wireless clients.

Best links for wireless clients may be provided. A computing device may receive, from a client device, a request to join a network. Then, in response to receiving the request to join the network, initial characteristics of the client device may be evaluated. Next, an initial plurality of links list may be provided to the client device in response to evaluating the initial characteristics of the client device. Subsequent characteristics of the client device may then be evaluated. An updated plurality of links list may be provided to the client device in response to evaluating the subsequent characteristics of the client device.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Multi-link operation may comprise an important feature in Extremely High Throughput (EHT). This operation may allow a multi-link capable client device (i.e., Multi-link Device (MLD)) to establish multiple Wireless Local Area Network (WLAN) links to multi-link capable Access Points (APs) natively. This may be used for a variety of purposes, including for example, load balancing, application steering, and redundancy. In Institute of Electrical and Electronics Engineers (IEEE) standards for 802.11be, an AP may announce other AP MLD members in a beacon using a currently defined Reduced Neighbor Report. This may result in the AP providing a Basic Service Set Identifier (BSSID) of other radio(s) and may allow client devices to make an uplink choice. However, with conventional processes, the network may only provide a static list of the AP MLD members and may let the client device decide which uplink to choose. Leaving the decision to the client device without the wireless network providing the best links may lead the client device to choose a suboptimal link or may unevenly balance uplink traffic in the wireless network (impacting wireless network performance), because the multi-links may end up on the same AP limiting the efficiency and redundancy that may be required for certain Ultra-Reliable Low-Latency Communication (URLLC) related services.

In such cases, it may be desirable for the wireless network to dynamically provide a plurality of links list (e.g., the best top N link options) to the client device with a ranked link-pair providing performance metrics to allow the client device to choose the most appropriate link for establishing multi-link association. Additionally, it may also be desirable to provide links that are across multiple APs for client devices that run applications requiring higher levels of redundancy. Accordingly, the infrastructure may have more influence over which MLD links a client device chooses rather than the client device selecting the links independently. Accordingly, embodiments of the disclosure may dynamically provide, for example, the best top N link options to a client device. The ranked link-pair options provided in the list may include performance metrics and thus may allow the client device to choose the most appropriate link(s) for establishing multi-link association for example.

FIG. 1 shows an operating environment 100 for providing best links for wireless clients. As shown in FIG. 1, operating environment 100 may comprise a controller 105 and a coverage environment 110. Coverage environment 110 may comprise, but is not limited to, a Wireless Local Area Network (WLAN) comprising a plurality of Access Points (APs) that may provide wireless network access (e.g., access to the WLAN for client devices. The plurality of APs may comprise a first AP 115, a second AP 120, a third AP 125, a fourth AP 130, and a fifth AP 135. The plurality of APs may provide wireless network access to a client device 140 operated by a user 145 as client device 140 moves within coverage environment 110 from a first location 150 to a second location 155. Client device 140 may comprise, but is not limited to, a smart phone, a personal computer, a tablet device, a mobile device, a telephone, a remote control device, a set-top box, a digital video recorder, an Internet-of-Things (IoT) device, a network computer, a router, or other similar microcomputer-based device. Each of the plurality of APs may be compatible with specification standards such as, but not limited to, the Institute of Electrical and Electronics Engineers (IEEE) 802.11ax specification standard for example.

As described in greater detail below, embodiments of the disclosure may provide processes in which a wireless network may dynamically provide a plurality of links list (e.g., the best top N link options) to client device 140 especially as client device 140 moves from first location 150 to second location 155 in coverage environment 110. The ranked link-pair in the plurality of links list may include performance metrics and thus may allow client device 140 to choose the most appropriate link(s) for establishing a multi-link association for example.

Controller 105 may comprise a Wireless Local Area Network controller (WLC) and may provision and control coverage environment 110 (e.g., a WLAN). Controller 105 may allow client device 140 to join coverage environment 110. In some embodiments of the disclosure, controller 105 may be implemented by a Digital Network Architecture Center (DNAC) controller (i.e., a Software-Defined Network (SDN) controller) that may configure information for coverage environment 110 in order to provide best links for wireless clients.

The elements described above of operating environment 100 (e.g., controller 105, first AP 115, second AP 120, third AP 125, fourth AP 130, fifth AP 135, or client device 140) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 4, the elements of operating environment 100 may be practiced in a computing device 400.

Consistent with embodiments of the disclosure, each client device may have its own physical characteristics and constraints. For example, some client devices may perform poorly when on dual 5 GHz/6 GHz while some client devices may not as they may have their unique antenna placement and separation depending on the form factor and the design constraints.

For example, a client device (e.g., a smart phone) may have two 5 GHz and two 2.4 GHz radios, but their separation may be different. Antenna position may imply that lower antennas may have better performance than top antenna when an AP may be on an opposite side of the client device user's head when the client device is held to the user's head. The client device user's head position may reduce a signal, for example, by 30 dB for a top antenna, but by 12 to 15 dB for a lower antenna. By contrast, the hand position of the client device user may affect differently the top and bottom antenna depending on the way the client device (e.g., a smart phone) may be held. Embodiments of the disclosure may consider this issue for dual link assignment.

Consistent with embodiments of the disclosure, client device location may be known. For example, trilateration, Angle-of-Arrival (AoA), or time-based ranging process may be used to determine the approximate client device location. Moreover, site calibration results in an expectation of client device signal level on any AP in range at a target level for that location and form factor may be used. Embodiments of the disclosure may determine hand movement of the user of the client device by using signal means modeling. For example, embodiments of the disclosure may record, for a given location (e.g., a grid square as described below), a mean signal level on neighboring APs for each client device subtype. Subtype may comprise, but is not limited to, kind of device (e.g., laptop, smartphone, tablet) operating system used, model of the client device, manufacturer of the device, etc. This mean may represent common paths and positions of users' devices over time, thus includes free path transmission (e.g., understood as no body obstacle) along with transmission through obstacles (e.g., a user's hand or head). This process may also record the current device's signal level at a same grid position, and may deduce a probability of an obstacle, (e.g., user head or hand) between the client device and an active AP radio.

In other embodiments, the hand movement of the user of the client device may be determined using a signal stream structure used by the client device. For example, a correlation may be made by observing the known client device capabilities and its current transmission characteristics. For example, in the presence of a strong obstacle (e.g., a head of the user) in front of antenna 2, the client device (e.g., a smart phone) may transmit using only one spatial stream. Similarly, the presence of an obstacle displaying absorption variance (e.g., a hand of the user) may cause the client device to alternate between one spatial stream and two spatial streams. This embodiment may complement or replace the aforementioned signal mean modeling embodiment. A goal of this phase may be to model if the client device (e.g., an MLD) should focus on one 2.4 GHz plus one 5 GHz/6 GHz link, two 5 GHz links, or other combination of the two, based on the client device's current transmission possibilities. The signal strength grid and related correlation of form-factor may be estimated from the point of view of each BSSID (co-located and non-co-located/neighbor) and thus a top N best links may be chosen from the set of N×M×K. N may comprise the number of transmit spatial streams, M may comprise the number of radios/co-located BSSIDs (e.g., 2.4 GHz/5 GHz/6 GHz), and K may comprise 1 plus the number of non-co-located neighbor APs.

Consistent with embodiments of the disclosure, throughout the floor (e.g., coverage environment 110), Wi-Fi 7 multi-link sensors, for example, may explore the plurality of APs in range and radio combinations. Sensor tests may constantly run with one initial link and permutation of all other multi-link nearby radios (e.g., same AP radio and other AP radio as well). These tests may comprise MLD sounding exchanges so as to minimize airtime. By alternating the triggering side (sensor or AP), and by testing the various radios/channels in range of each sensor, these tests may validate both the Uplink (UL) and the Downlink (DL) to/from each radio.

The per-link MLD sounding tests may be link-layer measurements and may not be a substitute for per-antenna Radio Frequency (RF) sounding exchanges between an AP radio and a client device (or group) prior to grouped transmissions (e.g. DL-Multi-User, Multiple Input, Multiple Output (MU-MIMO)). As such, the interval between MLD tests may be much larger than for AP-to-client device RF sounding prior-to-transmission intervals (e.g., 1 s vs. 50 ms for DL-MU-MIMO). Additionally, the MLD sounding test may be augmented, at intervals, with a nonce payload exchange (e.g., to an associated link). This exchange may measure the AP processing time for the decrypt/dequeue/parsing/queue/crypt/transmission phase. This element may provide a view of AP latency at various Channel Utilization (CU) levels.

These results may be captured by the enterprise network (e.g., controller 105) and classified with best pair with the associated anchor link/BSSID. The sensor test results may become the seed from which the network may select the top N best link(s)/BSSIDs for the client device (as per the aforementioned signal stream structure N×M×K process), based on its location in the grid, sensor proximity, and its physical characteristics.

In other embodiments, the client devices (i.e., non-dedicated sensors) may perform the MLD sounding function. In this case each client device may perform MLD sounding across the various link pairs (e.g., 2 GHz/5 GHz/6 Ghz), to the same AP as well as across APs during periodic scan periods (e.g. probe/response pair). The sounding exchanges with the current radios may be one source of such measurements. As buffer status and battery consideration schemes permit, the client devices may also perform tests similar to this described above for the sensor, against other radios in range. Crypto nonce test may only occur with each associated link/BSSID. The client devices may also use their sorted list of BSSIDs to decide which channels to test (e.g., top 6 or other process). The client devices may provide the link-pair measurement results to the AP that may then be augmented with the results obtained from the sensor to create a comprehensive ranked link-pair(s) list corresponding to each location.

Figure 2:
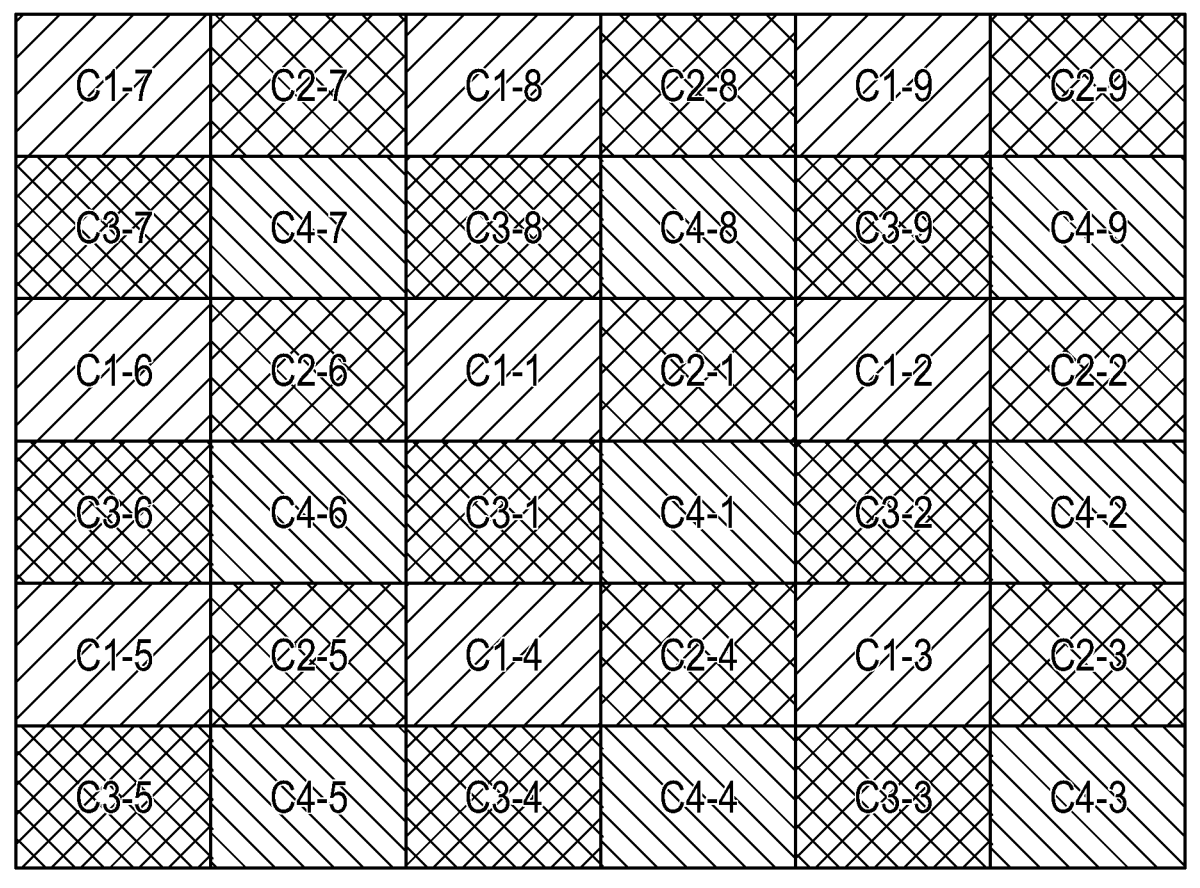

FIG. 2 is a diagram that illustrates possible link-pair combinations a multi-link sensor may scan. In one embodiment, a network of cells may be configured in coverage environment 110 for maximal roaming coverage because the links (i.e., BSSID) of the MLD may be in different cells. For example, a client device in cell C1-1 (e.g., channel 1 in cell 1) may scan neighboring links C2-1, C4-1, C3-1, C4-6, C2-6, C4-7, C3-8, and C4-8 representing 8 possible roaming/MLD link combination opportunities for any client device in that cell. Each link-pair may then be further classified as the option for each class of service and application (e.g., Augmented Reality (AR)/Virtual Reality (VR) (low latency), redundancy, process automation, etc.

Figure 3:
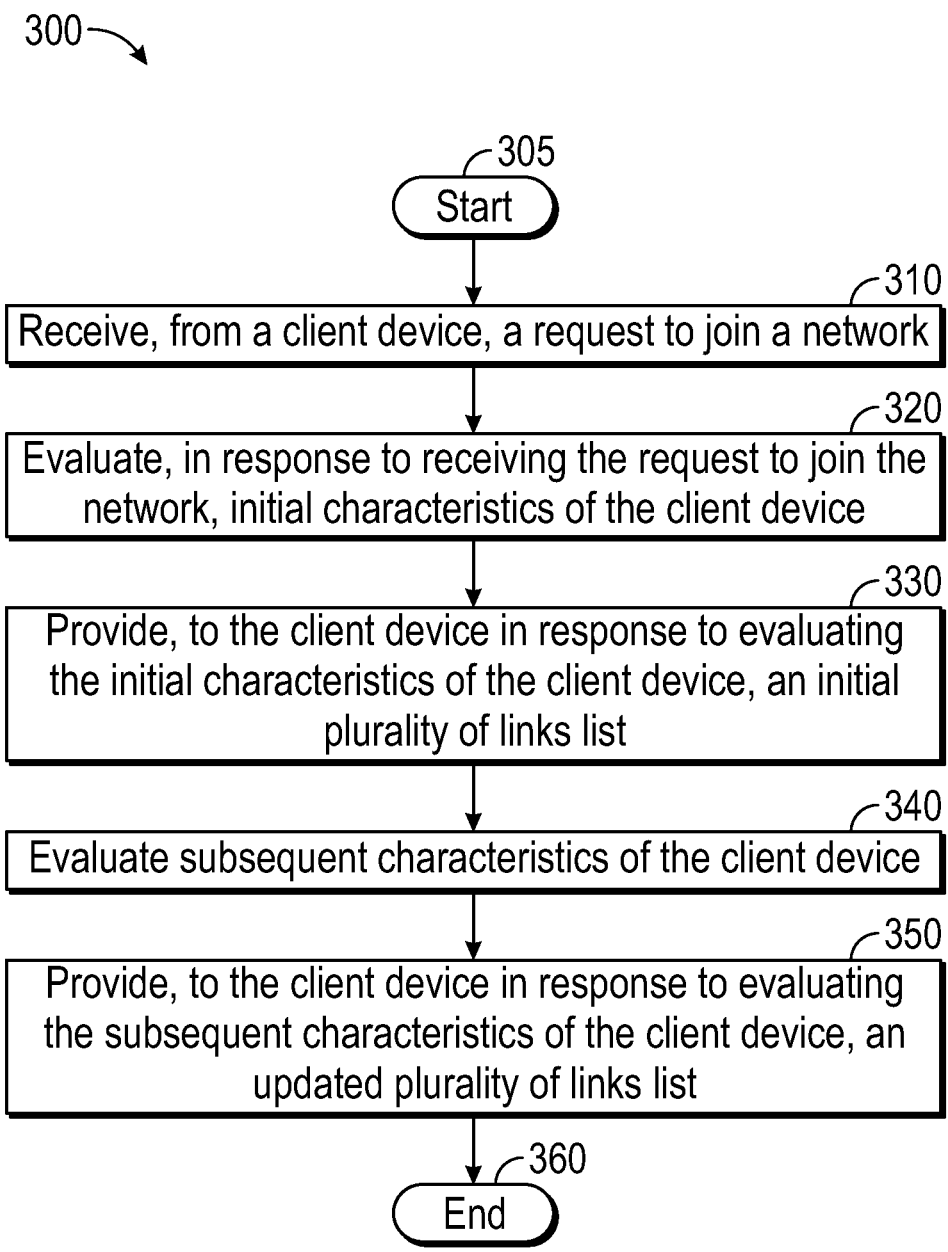
FIG. 3 is a flow chart of a method for providing best links for wireless clients.

FIG. 3 is a flow chart setting forth the general stages involved in a method 300 consistent with an embodiment of the invention for providing best links for wireless clients. Method 300 may be implemented using computing device 400 as described in more detail below with respect to FIG. 4. As stated below, computing device 400, for example, may provide an operating environment for controller 105, first AP 115, second AP 120, third AP 125, fourth AP 130, and fifth AP 135. Ways to implement the stages of method 300 will be described in greater detail below.

Method 300 may begin at starting block 305 and proceed to stage 310 where computing device 400 may receive, from client device 140, a request to join a network (e.g., the wireless network of coverage environment 110 as described above with respect to FIG. 1). For example, client device 140 may send a request to join on one of the plurality of APs in the wireless network of coverage environment 110. As a result, computing device 400 may ascertain one or more initial characteristics of client device 140 comprising, but not limited to, device physical characteristics of client device 140, detected transmission structure of client device 140, and a location of client device 140.

From stage 310, where computing device 400 receives, from client device 140, the request to join the network, method 300 may advance to stage 320 where computing device 400 may evaluate, in response to receiving the request to join the network, initial characteristics of client device 140. For example, when the client device 140 joins on one link, based on the one or more initial characteristics of client device 140 (e.g., device physical characteristics, detected transmission structure, its location, etc.), an initial plurality of links list (i.e., an initial priority list of the MLD structure or a list of top N links) with optionally service class/applications associated with client device 140 may be determined from the evaluation.

Once computing device 400 evaluates, in response to receiving the request to join the network, initial characteristics of client device 140 in stage 320, method 300 may continue to stage 330 where computing device 400 may provide, to client device 140 in response to evaluating the initial characteristics of client device 140, the initial plurality of links list. For example, the initial plurality of links list is provided to client device 140 allowing client device 140 to be influenced by the infrastructure of operating environment 100.

After computing device 400 provides, to client device 140 in response to evaluating the initial characteristics of client device 140, the initial plurality of links list in stage 330, method 300 may proceed to stage 340 where computing device 400 may evaluate subsequent characteristics of client device 140. For example, based on subsequent characteristics of client device 140, computing device 400 may reevaluate the MLD structure in operating environment 100 for client device 140. Subsequent characteristics of client device 140 may comprise, but are not limited to, any one or more of movement of client device 140, user 145's hand movement/location, and application changes client device 140. As described above in greater detail, user 145's hand movement/location may be determined using signal means modeling, using the signal stream structure used by client device 140, or channel state information for example.

From stage 340, where computing device 400 evaluates the subsequent characteristics of client device 140, method 300 may advance to stage 350 where computing device 400 may provide, to client device 140 in response to evaluating the subsequent characteristics of client device 140, an updated plurality of links list. For example, the updated plurality of links list (i.e., updated best top N link options) may be deliver to client device 140, allowing client device 140 MLD uplink selection to be dynamic.

Consistent with embodiments of the disclosure, the initial plurality of links list and the updated plurality of links list may include elements such as, but not limited to, the Tx antenna, the channel, the BSSID, and key metrics (e.g., expected RSSI, throughput, latency, etc.). These elements may allow client device 140 to evaluate new traffic flows (e.g., socket call incoming from the upper Layers for the SONET_RTVoice queue) and, based on the combination of current flows in the stack, determine which MLD links may provide the best combination. The best combination, in this context, may be determined by client device 140, as representing the link offering enough throughput and latency performances for each application bucket category currently in buffer. As such, this process may be Kanban-centric, focusing on the best link characteristic match per buckets of the present flow. In other words, client device 140 may not pick the links with highest throughput and lowest latency, but the links that match the application requirements for example. Once computing device 400 provides, to client device 140 in response to evaluating the subsequent characteristics of client device 140, an updated plurality of links list in stage 350, method 300 may then end at stage 360.

Figure 4:
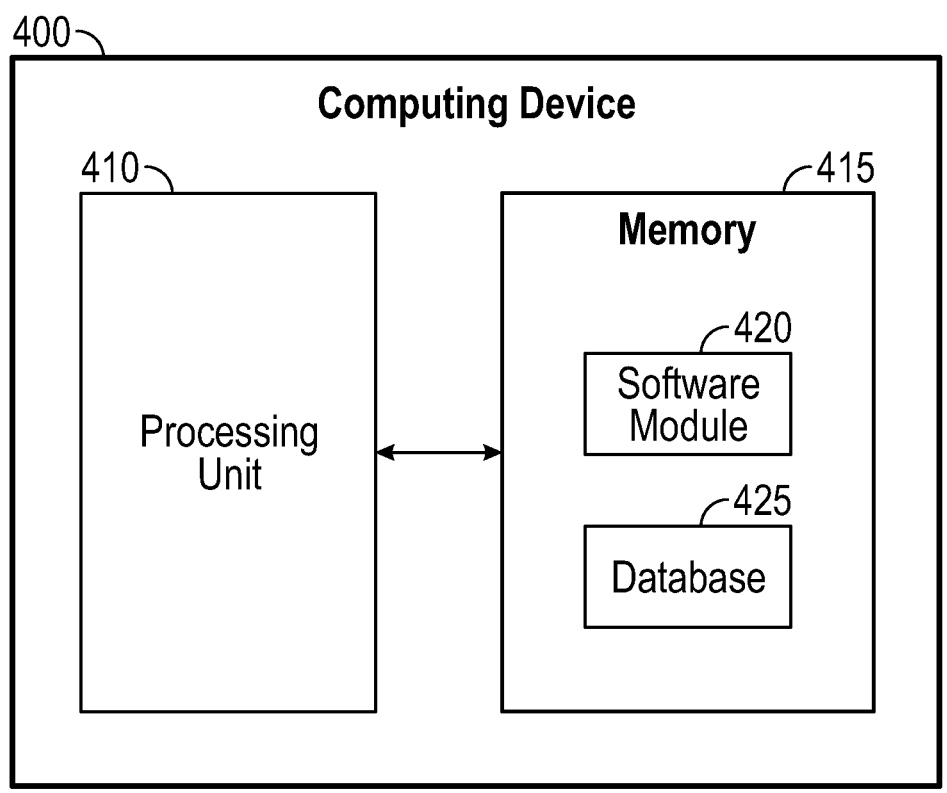
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for providing best links for wireless clients as described above with respect to FIG. 3. Computing device 400, for example, may provide an operating environment for controller 105, first AP 115, second AP 120, third AP 125, fourth AP 130, fifth AP 135, or client device 140. Controller 105, first AP 115, second AP 120, third AP 125, fourth AP 130, fifth AP 135, or client device 140 may operate in other environments and are not limited to computing device 400.

Computing device 400 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above.

Rather, the specific features and acts described above are disclosed as example for embodiments of the disclosure.

What is claimed is:

1. A method comprising:
receiving, by a computing device from a client device, a request to join a network;
evaluating, in response to receiving the request to join the network, initial characteristics of the client device;
providing, to the client device in response to evaluating the initial characteristics of the client device, an initial plurality of links list;
evaluating subsequent characteristics of the client device, wherein evaluating subsequent characteristics of the client device comprises evaluating at least one of movement of the client device, hand movement of a user of the client device, and an application change on the client device, and wherein evaluating the hand movement of the user of the client device comprises determining the hand movement of the user device using signal means modeling wherein the signal means modeling deduces a probability of an obstacle between the client device and a Access Point (AP) radio; and
providing, to the client device in response to evaluating the subsequent characteristics of the client device, an updated plurality of links list.

2. The method of claim 1, wherein the signal means modeling comprises free path transmission.

3. The method of claim 1, wherein the signal means modeling records device signal level at a same grid position.

4. The method of claim 1, wherein the hand movement of the user of the client device is determined using a signal stream structure used by the client device.

5. A system comprising:
a memory storage; and
a processing unit, the processing unit coupled to the memory storage, wherein the processing unit:
receive, from a client device, a request to join a network,
evaluate, in response to receiving the request to join the network, initial characteristics of the client device,
provide, to the client device in response to evaluating the initial characteristics of the client device, an initial plurality of links list,
evaluate subsequent characteristics of the client device, wherein the processing unit evaluate subsequent characteristics of the client device comprises the processing unit evaluate at least one of movement of the client device, hand movement of a user of the client device, and an application change on the client device, and wherein the processing unit evaluate the hand movement of the user of the client device comprises the processing unit determine the hand movement of the user device using signal means modeling wherein the signal means modeling deduces a probability of an obstacle between the client device and a Access Point (AP) radio, and
provide, to the client device in response to evaluating the subsequent characteristics of the client device, an updated plurality of links list.

6. The system of claim 5, wherein the hand movement of the user of the client device is determined using a signal stream structure used by the client device.

7. A computer-readable medium that stores a set of instructions which when executed perform a method executed by the set of instructions comprising:
receiving, by a computing device from a client device, a request to join a network;
evaluating, in response to receiving the request to join the network, initial characteristics of the client device;
providing, to the client device in response to evaluating the initial characteristics of the client device, an initial plurality of links list;
evaluating subsequent characteristics of the client device, wherein evaluating subsequent characteristics of the client device comprises evaluating at least one of movement of the client device, hand movement of a user of the client device, and an application change on the client device, and wherein evaluating the hand movement of the user of the client device comprises determining the hand movement of the user device using signal means modeling wherein the signal means modeling deduces a probability of an obstacle between the client device and a Access Point (AP) radio; and
providing, to the client device in response to evaluating the subsequent characteristics of the client device, an updated plurality of links list.

8. The computer-readable medium of claim 7, wherein the hand movement of the user of the client device is determined using a signal stream structure used by the client device.

9. The computer-readable medium of claim 7, wherein the signal means modeling comprises free path transmission.

10. The computer-readable medium of claim 7, wherein the signal means modeling records device signal level at a same grid position.

* * * * *